United States Patent [19]

Crabtree et al.

[11] Patent Number: 4,637,890

[45] Date of Patent: Jan. 20, 1987

[54] DETERGENT COMPOSITION PROVIDING RINSE CYCLE SUDS AND TURBIDITY CONTROL CONTAINING A SOAP, QUATERNARY AMMONIUM SALT AND A SILICONE

[75] Inventors: Paul J. Crabtree, Cincinnati, Ohio; Kazuhiko Imakawa, Takarazuka, Japan

[73] Assignee: The Procter & Gamble Company, Cincinnati, Ohio

[21] Appl. No.: 821,670

[22] Filed: Jan. 23, 1986

[51] Int. Cl.[4] ........................ B01D 19/04; C11D 9/36; C11D 10/04; C11D 17/06

[52] U.S. Cl. ........................................ 252/90; 252/92; 252/97; 252/98; 252/110; 252/117; 252/132; 252/174; 252/174.13; 252/174.15; 252/321; 252/358; 252/528; 252/547

[58] Field of Search ........................ 252/90, 92, 97, 98, 252/110, 117, 132, 174, 174.13, 174.15, 321, 358, 528, 547

[56] References Cited

U.S. PATENT DOCUMENTS

| | | | |
|---|---|---|---|
| 3,560,401 | 2/1971 | O'Hara | 252/358 |
| 3,714,074 | 1/1973 | Inamorato | 252/528 |
| 3,716,499 | 2/1973 | Inamorato | 252/524 |
| 3,730,912 | 5/1973 | Inamorato | 252/110 |
| 3,801,475 | 4/1974 | Taylor | 252/358 |
| 3,933,672 | 1/1976 | Bartolotta | 252/116 |
| 4,013,574 | 3/1977 | Leikhim | 252/99 |
| 4,298,480 | 11/1981 | Wixon | 252/8.75 |

FOREIGN PATENT DOCUMENTS

| | | | |
|---|---|---|---|
| 1189114 | 4/1970 | United Kingdom . | |
| 1204123 | 9/1970 | United Kingdom | 252/106 |

*Primary Examiner*—Dennis L. Albrecht
*Attorney, Agent, or Firm*—Monte D. Witte; Thomas H. O'Flaherty; Richard C. Witte

[57] ABSTRACT

Detergent compositions comprising surfactant, at least one soluble detergency builder, and a plurality of rinse cycle suds control prills comprising fatty acid soap, quaternary ammonium salt, and silicone fluid suds suppressor. The granular detergent compositions of this invention provide control of the level of suds on the surface of the water and reduce the turbidity of the water during the rinse cycle without interfering with the level of suds on the surface of the water during the wash cycle of laundering operations.

5 Claims, No Drawings

DETERGENT COMPOSITION PROVIDING RINSE CYCLE SUDS AND TURBIDITY CONTROL CONTAINING A SOAP, QUATERNARY AMMONIUM SALT AND A SILICONE

TECHNICAL FIELD AND BACKGROUND ART

The present invention relates to detergent compositions containing as an essential component a plurality of rinse cycle suds and turbidity control prills. More specifically, the invention in its broadest context encompasses detergent compositions comprising a surfactant, a soluble detergency builder, and a plurality of rinse cycle suds and turbidity control prills (hereinafter for simplicity referred to merely as "rinse cycle suds control prills").

Soiled clothing is frequently laundered by being placed in a mechanical washing machine along with the prescribed quantity of a detergent composition and water. The soiled clothing is then agitated in the aqueous solution of the detergent composition for the requisite period of time in what is called the "wash cycle." At the end of the wash cycle, most of the aqueous solution of the detergent composition, along with suspended soils, is drained from the washing machine and otherwise mechanically removed from the clothing. Additional fresh water is introduced into the washing machine in an effort to remove residual soil and detergent composition in one or more "rinse cycles." Currently available detergent compositions can provide adequate, and even exemplary, soil removal from the clothing during the wash cycle. Depending upon the type of washing machine involved and the particular detergent composition, a level of suds is maintained on the surface of the wash water during the wash cycle. This level of suds, among other things, serves to indicate to the person responsible for laundering the clothes that the requisite amount of detergent composition has been used in the wash cycle. After the aqueous solution of the detergent composition has been removed from the clothing at the end of the wash cycle, a finite quantity of the surfactant remains with the clothing and is carried forward into the rinse cycle. This surfactant from the detergent composition frequently causes a layer of suds to be produced on the surface of the water in the washing machine during the rinse cycle. Unlike the layer of suds on the surface of the water during the wash cycle, many people consider the layer of suds on the surface of the water during the rinse cycle to be aestheticly displeasing. Further, the rinse water can exhibit a cloudiness or turbidity which many people also find aestheticly displeasing.

Silicones have been used and taught as effective agents for controlling suds during a wash cycle. For example, U.S. Pat. No. 3,455,839 issued to Lawrence A. Rauner, on July 15, 1969 relates to compositions and processes for defoaming aqueous solutions by incorporating therein small amounts of polydimethylsiloxane fluids.

U.S. Pat. No. 4,136,045 issued to Gault and Maguire, Jr. on Jan. 23, 1979 discloses the combination of nonionic surfactant and a silicone suds suppressing agent in detergent compositions to reduce suds during the wash cycle.

U.S. Pat. No. 3,829,386 issued Wegst et al on Aug. 13, 1974 also discusses a combination of nonionic surfactant and silicone fluid added to a detergent composition to provide suds control during the wash cycle.

It is object of the present invention to provide a granular detergent composition which exhibits control of suds during the rinse cycle while maintaining aesthetically pleasing levels of wash cycle suds. It is a further object of the present invention to provide a granular detergent composition which exhibits a reduction of turbidity during the rinse cycle.

SUMMARY OF THE INVENTION

The present invention encompasses granular detergent compositions providing suds and turbidity control during the rinse cycle, said granular detergent compositions comprising:

i. At least one surfactant;

ii. At least one soluble detergency builder; and iii. A plurality of rinse cycle suds control prills, said prills comprising:

(a) fatty acid soap;

(b) at least one quaternary ammonium salt; and (c) at least one silicone fluid suds suppressor.

DETAILED DESCRIPTION OF THE INVENTION

While this specification concludes with claims particularly pointing out and distinctly claiming that which is considered to be the invention, it is believed that the invention can be better understood from a reading of the following detailed description of the invention and the appended example.

The granular detergent composition of the present invention comprises three essential components: surfactant; at least one soluble detergency builder; and a plurality of rinse cycle suds control prills. Further, the detergent composition of the present invention is substantially free of insoluble detergency builder. (As used herein, "substantially free" refers to compositions containing less than about 1% insoluble detergency builder.) The individual components are described in detail below.

Surfactant

The detergent compositions of the instant invention can contain all manner of organic, water-soluble surfactants. (Surfactants are sometimes referred to in the art as "detergents" or "detergent compounds.") A typical listing of the classes and species of surfactants useful herein appears in U.S. Pat. No. 3,664,961, incorporated herein by reference. The following list of surfactants and mixtures thereof which can be used in the instant detergent compositions is respresentative of such materials, but is not intended to be limiting.

Water-soluble salts of the higher fatty acids (i.e. "soaps") are useful as the surfactant of the instant composition. This class of surfactants includes ordinary soaps such as the sodium, potassium, ammonium and alkanolammonium salts of higher fatty acids containing from about 8 to about 24 carbon atoms and preferably from about 10 to about 20 carbon atoms. Soaps can be made by direct saponification of fats and oils or by the neutralization of free fatty acids. Particularly useful are the sodium and potassium salts of the mixtures of fatty acids derived from coconut oil and tallow, i.e., sodium or potassium tallow and coconut soap.

Another class of surfactants includes water-soluble salts, particularly the alkali metal, ammonium and alkanolammonium salts, of organic sulfuric reaction products having in their molecular structure an alkyl group containing from about 8 to about 22 carbon atoms and a sulfonic acid or sulfuric acid ester group. (Included in the term "alkyl" is the alkyl portion of acyl groups.) Examples of this group of synthetic surfactants which form a part of the detergent compositions of the present invention are the sodium and potassium alkyl sulfates, especially those obtained by sulfating the higher alcohols ($C_8$–$C_{18}$ carbon atoms) produced by reducing the glycerides of tallow or coconut oil; and sodium and potassium alkylbenzene sulfonates, in which the alkyl group contains from about 9 to about 15 carbon atoms, in straight chain or branched chain configuration, e.g. those of the type described in U.S. Pat. Nos. 2,220,099 and 2,477,383, incorporated herein by reference. Especially valuable are linear straight chain alkylbenzene sulfonates in which the average length of the alkyl groups is about 13 carbon atoms, abbreviated as $C_{13}$ LAS.

Other anionic surfactants useful herein include the sodium alkyl glyceryl ether sulfonates, especially those ethers of higher alcohols derived from tallow and coconut oil; sodium coconut oil fatty acid monoglyceride sulfonates and sulfates; and sodium or potassium salts of alkyl phenol ethylene oxide ether sulfate containing from about 1 to about 10 units of ethylene oxide per molecule and wherein the alkyl groups contain about 8 to about 13 carbon atoms.

Water-soluble nonionic synthetic surfactants are also useful as the surfactant component of the instant detergent composition. Such nonionic surfactants can be broadly defined as compounds produced by the condensation of ethylene oxide groups (hydrophilic in nature) with an organic hydrophobic compound, which may be aliphatic or alkyl aromatic in nature. The length of the polyoxyethylene group which is condensed with any particular hydrophobic group can be readily adjusted to yield a water-soluble compound having the desired degree of balance between hydrophilic and hydrophobic elements.

For example, a well-known class of nonionic synthetic surfactants is made available on the market under the trade mark "Pluronic". These compounds are formed by condensing ethylene oxide with a hydrophobic base formed by the condensation of propylene oxide with propylene glycol. Other suitable nonionic synthetic surfactants include the polyethylene oxide condensates of alkyl phenols, e.g., the condensation products of alkyl phenols having an alkyl group containing from about 6 to about 13 carbon atoms in either a straight chain or branched chain configuration, with ethylene oxide, the ethylene oxide being present in amounts equal to from about 4 to about 15 moles of ethylene oxide per mole of alkyl phenol.

The water-soluble condensation products of aliphatic alcohols having from about 8 to about 22 carbon atoms, in either straight chain or branched configuration, with ethylene oxide, e.g., a coconut alcohol-ethylene oxide condensate having from about 5 to about 30 moles of ethylene oxide per mole of coconut alcohol, the coconut alcohol fraction having from about 10 to about 14 carbon atoms, are also nonionic surfactants useful herein.

Semi-polar nonionic surfactants useful herein include water-soluble amine oxides containing one alkyl moiety of from about 10 to 20 carbon atoms and 2 moieties selected from the group consisting of alkyl groups and hydroxyalkyl groups containing from 1 to about 3 carbon atoms; water-soluble phosphine oxide surfactants containing one alkyl moiety of from about 10 to 20 carbon atoms and 2 moieties selected from the group consisting of alkyl groups and hydroxyalkyl groups containing from 1 to about 3 carbon atoms; and water-soluble sulfoxide surfactants containing one alkyl or hydroxyalkyl moiety of from about 10 to about 20 carbon atoms and a moiety selected from the group consisting of alkyl and hydroxyalkyl moieties of from 1 to about 3 carbon atoms.

Ampholytic surfactants useful herein include derivatives of aliphatic or aliphatic derivatives of heterocyclic secondary and tertiary amines in which the aliphatic moiety can be straight chain or branched and wherein one of the aliphatic substituents contains from about 8 to about 18 carbon atoms and at least one aliphatic substituent contains an anionic water-solubilizing group.

Zwitterionic surfactants useful herein include derivatives of aliphatic quaternary ammonium, phosphonium and sulfonium compounds in which the aliphatic moieties can be straight chain or branched, and wherein one of the aliphatic substituents contains from about 8 to about 18 carbon atoms and one contains an anionic water-solubilizing group.

Other surfactants useful herein include the water-soluble salts of esters of alpha-sulfonated fatty acids containing from about 6 to about 20 carbon atoms in the fatty acid group and from 1 to about 10 carbon atoms in the ester group; water-soluble salts of 2-acyloxy-alkane-1-sulfonic acids containing from about 2 to about 9 carbon atoms in the acyl group and from about 9 to about 20 carbon atoms in the alkane moiety; alkyl ether sulfates containing from about 10 to about 20 carbon atoms in the alkyl group and from about 1 to about 12 moles of ethylene oxide; water-soluble salts of olefin sulfonates containing from about 12 to 20 carbon atoms; and beta-alkyloxy alkane sulfonates containing from about 1 to 3 carbon atoms in the alkyl group and from about 8 to 20 carbon atoms in the alkane moiety.

Preferred water-soluble organic surfactants useful herein include linear alkylbenzene sulfonates containing from about 11 to about 13 carbon atoms in the alkyl group; $C_{10-18}$ alkyl sulfates; $C_{10-16}$ alkyl glyceryl sulfonates; $C_{10-18}$ alkyl ether sulfates, especially wherein the alkyl moiety contains from about 14 to 18 carbon atoms and wherein the average degree of ethoxylation between 1 and 6; $C_{10-18}$ alkyl dimethyl amine oxides, especially wherein the alkyl group contains from about 11 to 16 carbon atoms; alkyldimethyl ammonio propane sulfonates and alkyldimethyl ammonio hydroxy propane sulfonates wherein the alkyl group in both types contains from 14 to 18 carbon atoms; soaps, as hereinabove defined; and the condensation product of $C_{10-18}$ fatty alcohols with from about 3 to about 15 moles of ethylene oxide.

Specific surfactants preferred for use herein include: sodium linear $C_{10-13}$ alkylbenzene sulfonates; sodium $C_{12-18}$ alkyl sulfates; sodium salts of sulfated condensation product of $C_{12-18}$ alcohols with from about 1 to about 3 moles of ethylene oxide; the condensation product of a $C_{10-18}$ fatty alcohols with from about 4 to about 10 moles of ethylene oxide; and the water-soluble sodium and potassium salts of higher fatty acids containing from about 10 to about 18 carbon atoms.

It is to be recognized that any of the foregoing surfactants can be used separately herein, or in mixtures of surfactants.

The detergent composition of this invention comprises from about 5% to about 50%, preferably from about 10% to about 30%, surfactant. (Unless otherwise specified, all percentages mentioned in this specification are percentages by weight.)

Detergency Builder

The detergent compositions of the present invention also contain at least one soluble detergency builder such as those commonly taught for use in detergent compositions. Such detergency builders are employed to sequester hardness ions and to help adjust the pH of the laundering liquor (wash solution). Such builders can be employed at from about 5% to about 94% by weight, preferably from about 10% to about 50% by weight, of the detergent composition to provide their sequestering and pH-controlling functions. As used herein, the term "soluble" refers to materials which are soluble to the extent of at least about 3 grams per deciliter at 25° Celsius in aqueous solutions (at use concentrations) of the aforementioned surfactants.

The builders used herein include any of the conventional inorganic and organic water-soluble builder salts.

Such builders can be, for example, water-soluble salts of phosphates including tripolyphosphates, pyrophosphates, orthophosphates, higher polyphosphates, carbonates, silicates, and organic polycarboxylates. Specific preferred examples of inorganic phosphate builders include sodium and potassium tripolyphosphates and pyrophosphates.

Nonphosphorus-containing materials can also be selected for use herein as detergency builders.

Specific examples of nonphosphorus, inorganic detergency builders include water-soluble inorganic carbonate, bicarbonate, and silicate salts. The alkali metal (e.g., sodium and potassium) carbonates, bicarbonates, and silicates are particularly useful herein.

Other water-soluble organic detergency builders are also useful herein. For example, alkali metal, ammonium and substituted ammonium polycarboxylates are useful in the present compositions. Specific examples of useful polycarboxylate builder salts include sodium, potassium, ammonium and substituted ammonium salts of ethylenediaminetetraacetic acid, nitrilotriacetic acid, oxydisuccinic acid, mellitic acid, benzene polycarboxylic acid, polyacrylic acid, polymaleic acid, and citric acid.

Other useful polycarboxylate detergency builders are the materials set forth in U.S. Pat. No. 3,308,067 issued to Diehl, on Mar. 7, 1967, incorporated herein by reference. Examples of such materials include the water-soluble salts of homo- and co-polymers of aliphatic carboxylic acids such as maleic acid, itaconic acid, mesaconic acid, fumaric acid, aconitic acid, citraconic acid, and methylenemalonic acid.

Other suitable non-polymeric polycarboxylates are the polyacetal carboxylates described in U.S. Pat. No. 4,144,226, issued Mar. 13, 1979 to Crutchfield et al, and U.S. Pat. No. 4,246,495, issued Mar. 27, 1979 to Crutchfield et al, both incorporated herein by reference. These polyacetal carboxylates can be prepared by bringing together under polymerization conditions an ester of glyoxylic acid and a polymerization initiator. The resulting polyacetal carboxylate ester is then attached to chemically stable end groups to stabilize the polyacetal carboxylate against rapid depolymerization in alkaline solution, converted to the corresponding salt, and added to a surfactant.

Rinse Cycle Suds Control Prills

As used in this specification the term "prill" is used to denote a particulate solid material. Unless specifically required by the context of the discussion, the "prills" of the present invention have no particular shape or size. They can be flakes, granules, round pellets, or the like.

The rinse cycle suds control prills comprise three necessary components: fatty acid soap; at least one quaternary ammonium salt; and at least one silicone fluid suds suppressor.

The fatty acid soaps useful in this invention are the water-soluble salts of the higher fatty acids. Soaps can be made by direct saponification of fats and oils or by the neutralization of free fatty acids. Examples of useful soaps are the sodium, potassium, ammonium, and alkylolammonium salts of higher fatty acids containing from about 8 to about 24 carbon atoms, preferably from about 12 to about 18 carbon atoms. Particularly useful are the sodium and potassium salts of the mixtures of fatty acids derived from coconut oil and tallow, i.e., sodium or potassium tallow and coconut soaps.

The quaternary ammonium compounds used in this invention have the general structure:

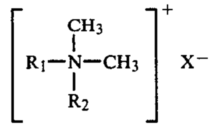

In this chemical structure $R_1$ is an alphatic hydrocarbon radical selected from the group consisting of methyl, ethyl, alkyl having from about 12 to about 18 carbon atoms, alkylene having from about 12 to about 18 carbon atoms, coconut and tallow. $R_2$ is an aliphatic hydrocarbon radical selected from the group consisting of alkyl having from about 12 to about 18 carbon atoms, alkylene having from about 12 to about 18 carbon atoms, coconut and tallow. X is a halogen.

As used herein "coconut" refers to the alkyl and alkylene moieties derived from coconut oil. It is recognized that coconut oil is a naturally occuring mixture having, as do all naturally occuring materials, a range of compositions. Coconut oil contains primarily fatty acids (from which the alkyl and alkylene moieties of the quaternary ammonium salts are derived) having from 12 to 16 carbon atoms, although fatty acids having fewer and more carbon atoms are also present. Swern, Ed. in *Bailey's Industrial Oil And Fat Products,* Third Edition, John Wiley and Sons (New York, 1964) in Table 6.5, suggests that coconut oil typically has from about 65 to 82% by weight of its fatty acids in the 12 to 16 carbon atom range with about 8% of the total fatty acid content being present as unsaturated molecules. The principle unsaturated fatty acid in coconut oil is oleic acid. Synthetic as well as naturally occuring "coconut" mixtures fall within the scope of this invention.

Tallow, as is coconut, is a naturally occuring material having a variable composition. Table 6.13 in the above-identified reference editied by Swern indicates that typically 78% or more of the fatty acids of tallow contain 16 or 18 carbon atoms. Typically, half of the fatty acids present in tallow are unsaturated, primarily in the form of oleic acid. Synthetic as well as natural "tallows" fall within the scope of the present invention. As used herein, "tallow" specifically includes those tallows which have been hydrogenated to significantly reduce the level of unsaturation therein.

Any of the halide salts can be used in the present invention. Typically, and preferably, the chloride is used. Hereinafter the quaternary ammonium compound will frequently be referred to as the chloride for convenience even though the other halide salts are expressly not disclaimed.

Other quaternary ammonium compounds useful in this invention have the general structure

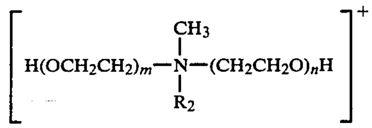

where $R_2$ and X are as defined above; m and n are both integers each having a value of at least 1; and the sum of m and n is from about 2 to about 15.

Specific examples of quaternary ammonium salts useful in this invention include trimethyloctadecylammonium chloride, trimethylcocoammonium chloride, trimethyltallowammonium chloride, trimethylolelylammonium chloride, methylbis(2-hydroxyethyl)cocoammonium chloride, methylbis(2-hydroxyethyl)oleylammonium chloride, methylbis(2-hydroxyethyl)octadecylammoium chloride, methylbis(2-hydroxyethyl)-tallowammoium chloride, methylpolyoxyethylene(15-)cocoammonium chloride, and methylpolyoxyethylene(15)olylammonium chloride.

The preferred quaternary ammonium compound is trimethyltallowammonium chloride.

The above quaternary ammonium compounds can be prepared by any of the means well known to those skilled in the art.

Silicone Fluid Suds Suppressors

The silicone fluid suds suppressors useful in this invention can be alkylated polysiloxane materials of several types. In industrial practice, the term "silicone" has become a generic term which encompasses a variety of relatively high molecular weight polymers containing siloxane units and hydrocarbyl groups of various types. In general terms, the silicone fluid suds suppressors can be described as containing siloxane moieties having the general structure

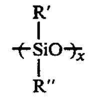

wherein x is from about 20 to about 2,000, and R′ and R″ are each alkyl or aryl groups, especially methyl, ethyl, propyl, butyl and phenyl. The polydimethylsiloxanes (R′ and R″ are methyl) having a molecular weight within the range of from about 200 to about 200,000, and higher, are all useful as suds suppressors. Such silicone fluid materials are commercially available from the Dow Corning Corporation under the trademark Silicone 200 Fluids.

Additionally, other silicone materials wherein the side chain groups R′ and R″ are alkyl, aryl, or mixed alkyl and aryl hydrocarbyl groups exhibit useful suds controlling properties. These materials are readily prepared by the hydrolysis of the appropriate alkyl, aryl or mixed alkylaryl silicone dichlorides with water in the manner well known in the art. As specific examples of such silicone suds controlling agents useful herein there can be mentioned, for example, diethyl polysiloxanes; dipropyl polysiloxanes, dibutyl polysiloxanes; methylethyl polysiloxanes; phenylmethyl polysiloxanes; and the like. The dimethyl polysiloxanes are particularly useful herein due to their low cost and ready availability.

Mixtures of the silicone fluid suds suppressors with other materials known as suds control agents, such as alkylated siloxane, can be used in the present invention.

The rinse cycle suds control prills can optionally contain other materials such as polyethylene glycol, fatty acid, and the like to enhance their physical structure and their processing.

The rinse cycle suds control prills used in the present invention comprise from about 0.1% to about 14% silicone fluid, preferably from about 2% to about 8%. The prills also comprise from about 5% to about 55% fatty acid soap, preferably from about 15% to about 30%. The mole ratio of fatty acid soap to quaternary ammonium salt in the prills is from about 0.1:1 to about 4:1, preferably from about 1:1 to about 2:1.

The rinse cycle suds control prills can be formed by any convenient means such as mixing the requisite quantities of silicone fluid suds suppressor and quaternary ammonium salt into molten fatty acid soap, and flaking the mixture as by milling or extruding the mixture to form a thin sheet, cooling to solidify the soap, and breaking the sheet into particles of the appropriate size. Alternatively, thin films of the mixture can be formed by cooling molten fatty acid soap containing the requisite quantities of silicone fluids suds suppressor and quaternary ammonium salt on a chill roll or belt cooler and then breaking the film into appropriate size flakes.

In preferred embodiments, the prills of the present invention have maximum dimensions of from about 8 to about 10 millimeters and minimum dimensions of from about 1 to about 2 millimeters. When the rinse cycle suds control prills have these dimensions, they can be mixed with the balance of the components of the detergent composition, the balance being in the form of spray dried granules.

Optional Components

The detergent composition of the present invention can contain all manner of additional materials commonly found in laundering and cleaning compositions. For example, the detergent compositions can contain thickeners and soil-suspending agents such as carboxymethylcellulose and the like. Enzymes, especially the proteases, amylases and lipases, can also be present. Various perfumes, optical bleaches, fillers, anticaking agents, fabric softeners and the like can be present in the compositions to provide the usual benefits occasioned by the use of such materials in detergent compositions.

The detergent composition herein can additionally contain from about 0.1% to about 20% of one or more bleaching agents. Preferred bleaching agents are hydrogen peroxide addition compounds. The hydrogen peroxide addition compounds may be organic, but are preferably inorganic in nature.

A great variety of these compounds exist. Most of them are prepared by crystallization from solutions containing $H_2O_2$. Others are prepared by drying a slurry containing the corresponding salts and $H_2O_2$. The most useful hydrogen peroxide addition compounds are the perborates, e.g., sodium perborate monohydrate and tetrahydrate. Sodium perborate monohydrate is preferred. Other valuable hydrogen peroxide addition compounds are the carbonate peroxyhydrates, e.g., $2Na_2CO_3.3H_2O_2$, and the phosphate peroxyhydrates, e.g., sodium pyrophosphate peroxyhydrate, $Na_4P_2O_7.2H_2O_2$. A suitable organic hydrogen peroxide addition compound which can be incorporated into the detergent compositions of the present invention is the urea hydrogen peroxide addition compound of the formula $CO(NH_2)_2.H_2O_2$, because it is a free flowing dry organic hydrogen peroxide addition compound.

Activators for these bleaches are also desirable additives. Preferred are the activators disclosed in U.S. Pat. No. 4,412,934, issued to Chung et al, on Nov. 1, 1983 incorporated herein by reference.

Other bleaching agents which can be used include oxygenating bleaches such as sodium or potassium persulfate (such as the mixed salt marketed as "Oxone") and organic per acids and peroxides, such as those disclosed in British Pat. Nos. 886,188, 1,293,063 and British Patent Application No. 5896/71. Magnesium salts of the peracids and peracids with high (greater than about 1000) melting points and magnesium salts thereof are preferred. Suitable magnesium salts are disclosed in U.S. Pat. No. 4,483,781 issued to Hartman on Nov. 20, 1984 incorporated herein by reference.

Halogen bleaches, such as hypochlorites and hypobromites, and compounds providing these ions in solution, can also be used in the present detergent compositions. Examples of useful materials are sodium hypochlorite, chlorinated trisodium phosphate, and organic N-chloro-compounds such as chlorinated isocyanuric acid compounds.

A detergent composition of this invention can also contain minor amounts of materials which make the product more attractive. The following are mentioned by way of example: tarnish inhibitors such as benzotriazole or ethylene thiourea in amounts up to about 2%; fluorescers, perfumes, and dyes in small amounts; alkaline material such as sodium or potassium carbonate or hydroxide in minor amounts as supplementary pH adjusters; bacteriostats; bactericides; corrosion inhibitors such as soluble alkali silicates (preferably sodium silicates having an $SiO_2/Na_2O$ ratio of from about 1:1 to about 2.8:1); and textile softening agents.

Detergent Composition

To prepare the detergent composition of the present invention, the rinse cycle control prills are prepared as noted above. The balance of the components of the detergent composition, including expressly the surfactant and the soluble detergency builder, and any of the optional components mentioned, are formed into granules by any convenient means well known to those skilled in the art such as, for example, providing a conventional crutcher mix and spray drying the mixture. The rinse cycle suds control prills are blended into the granular composition by any conventional means to form the detergent composition of the present invention. The rinse cycle suds control prills are incorporated at from about 1% to about 20% by weight of the total detergent composition.

Without exhibiting any intent to be bound by any theory of operation, it can be suggested that the detergent composition of the present invention functions in the following manner. A layer of suds forms on the surface of water used to rinse clothing which has just been laundered with the aid of a detergent composition because a finite amount of surfactant is carried by the clothing into the rinse cycle. If the present invention is used, a finite quantity of the components of the rinse cycle suds control prills will, likewise, be carried by the clothing into the rinse cycle. Because of their unique composition, the rinse cycle suds control prills will dissolve in the relatively high pH (e.g. about 9 to about 10.5 pH) wash solution, but the components of the prills do not dissociate in the wash solution. The silicone fluid suds suppressor does not, then, interfere with the normal sudsing action of the detergent composition during the wash cycle. With most of the detergency builder being removed from the system with the spent wash solution, the pH of the rinse solution is somewhat lower (e.g. about 6.5 to about 8.5 pH) than that of the preceeding wash solution. The components of the prills which have been physically carried into the rinse cycle by the clothing then dissociate at the lower pH thereby freeing the silicone fluid suds suppressor and making it available to perform its intended function of reducing the quantity of suds on the surface of the rinse water; the quaternary salt is also available to interfere with the film strength of any bubbles caused by any anionic surfactant present thereby further reducing the tendency for suds to form.

The following example is provided by way of illustration and not by way of limitation.

EXAMPLE

A base composition having the following composition is prepared by conventional spray drying procedures (the numbers in parenthesis are the parts by weight of each component in the base composition): $C_{13}LAS$ (9.6); alkyl sulfate having from 14 to 15 carbon atoms in the alkyl chain (9.6); synthetic polymer of acrylic acid and methacrylic acid having a molecular weight of about 60,000 (2.9); PEG 8000 (1.3); polyacrylic acid having a molecular weight of about 4,500 (1.4); soluble silicate (7.7); sodium carbonate (11.0); sodium diethylenetriaminepentaacetate (0.5); optical bleach (0.1); sodium sulfate (41.3); sodium perborate monohydrate (3.0); enzyme (0.7); PEG 600 (0.2); perfume (0.1); water/miscellaneous (5.5). This base composition is substantially free of insoluble detergency builder. Separately, the following components are incorporated into the molten soap, chilled, and flaked to make rinse cycle suds control prills (the numbers in parenthesis are the parts by weight of each component used): sodium fatty acid soap (80% tallow, 20% coconut) (21); trimethyltallowammonium chloride (13.2); Dow Corning 200 Fluid (2.4); palmitic acid (29.4); PEG 8000 (29.4); water/miscellaneous (4.6). The rinse cyle suds control prills, having a maximum dimension of about 3 millimeters, are physically incorporated into the base composition at a level of 5 parts by weight rinse cycle control prills to 95 parts by weight base composition to from a granular detergent composition of the present invention. This granular detergent composition exhibits enhanced rinse cycle suds control as compared to a similar granular detergent composition which does not contain the rinse cycle suds control prills.

What is claimed is:

1. A granular detergent composition providing reduced sudsing and rinse water turbidity during rinsing following a washing operation, said composition comprising:

(a) at least one surfactant;

(b) at least one soluble detergency builder; and (c) a plurality of rinse cycle suds control prills comprising:

(i) fatty acid soap;

(ii) at least one quaternary ammonium salt having at least one aliphatic hydrocarbon substituent containing from about 12 to about 18 carbon atoms; and (iii) at least one silicone fluid suds suppressor;

wherein said prills comprise from about 0.1% to about 14% by weight said silicone fluid, wherein said prills comprise from about 5% to about 55% by weight said soap, wherein the mole ratio of said soap to said quaternary ammonium salt in said prills is from about 0.1:1 to about 4:1, and wherein said composition comprises from about 1% to about 20% by weight of said prills.

2. The granular detergent composition of claim 1 wherein said composition comprises from about 5% to about 50% by weight said surfactant and from about 5% to about 94% by weight said builder.

3. The granular detergent composition of claim 2 wherein said prills comprise from about 2% to about 8% by weight said silicone fluid and from about 15% to about 30% by weight said soap, and wherein the mole ratio of said soap to said quaternary ammonium salt in said prills is from about 1:1 to about 2:1.

4. The granular detergent composition of claim 1 wherein said prills comprise from about 2% to about 8% by weight said silicone fluid and from about 15% to about 30% by weight said soap, and wherein the mole ratio of said soap to said quaternary ammonium salt in said prills is from about 1:1 to about 2:1.

5. A granular detergent composition providing reduced sudsing and rinse water turbidity during rinsing following a washing operation, said composition comprising:

(a) at least one anionic surfactant;

(b) at least one soluble builder; and (c) a plurality of rinse cycle suds controls prills comprising:

(i) fatty acid soap selected from the group consisting of:

((a)) coconut soap;

((b)) tallow soap; and ((c)) mixtures thereof;

(ii) trimethyltallowammonium chloride; and (iii) at least one polydimethylsiloxane silicone fluid suds suppressor;

wherein said prills comprise from about 2% to about 8% by weight said polydimethylsiloxane and from about 15% to about 30% by weight said soap, wherein the mole ratio of said soap to said chloride in said prills is from about 1:1 to 2:1, and wherein said detergent composition comprises from about 5% to about 50% by weight said surfactant and from about 5% to about 94% by weight said builder and from about 1% to about 20% by weight said prills.

* * * * *